(12) United States Patent  
Bondie et al.

(10) Patent No.: US 6,588,038 B1  
(45) Date of Patent: Jul. 8, 2003

(54) AIR PAD

(75) Inventors: Philip Bondie, Saline, MI (US);  
William Gallmeyer, Holland, MI (US);  
Judith Bondie, Saline, MI (US);  
Thomas Limperis, Tecumseh, MI (US)

(73) Assignee: AirSports, Technology L.L.C., Saline, MI (US)

( * ) Notice: Subject to any disclaimer, the term of this patent is extended or adjusted under 35 U.S.C. 154(b) by 0 days.

(21) Appl. No.: 09/562,985

(22) Filed: May 1, 2000

Related U.S. Application Data (62) Division of application No. 09/108,634, filed on Jul. 1, 1998  
(60) Provisional application No. 60/051,419, filed on Jul. 1, 1997.

(51) Int. Cl.$^7$ .............................................. A47C 27/08  
(52) U.S. Cl. .................... 5/709; 5/420; 5/654  
(58) Field of Search .......................... 5/709, 710, 420, 5/644, 706, 708, 713, 778, 654, 655.3, 655.9; 297/199, 200; 2/455, 456

(56) References Cited

U.S. PATENT DOCUMENTS

| | | |
|---|---|---|
| 3,849,801 A | 11/1974 | Holt et al. |
| 4,370,754 A | 2/1983 | Donzis |
| 4,458,429 A | 7/1984 | Schmid |
| 4,486,901 A | 12/1984 | Donzis |
| 4,547,919 A | 10/1985 | Wang |
| 4,566,137 A | 1/1986 | Gooding |
| 4,642,814 A | 2/1987 | Godfrey |
| 4,845,786 A | 7/1989 | Chiarella |
| 4,864,738 A | 9/1989 | Horovitz |
| 5,007,111 A | 4/1991 | Adams |
| 5,014,365 A | 5/1991 | Schulz |
| 5,158,767 A | 10/1992 | Cohen et al. |
| 5,274,846 A | 1/1994 | Kolsky |
| 5,362,076 A | 11/1994 | Thomas et al. |
| 5,430,960 A | 7/1995 | Richardson |
| 5,444,926 A | 8/1995 | Allen et al. |
| 5,575,090 A | 11/1996 | Condini |
| 5,588,227 A | 12/1996 | Goldston et al. |

*Primary Examiner*—Teri Pham Luu  
*Assistant Examiner*—Fredrick Conley  
(74) *Attorney, Agent, or Firm*—Harness, Dickey & Pierce, P.L.C.

(57) ABSTRACT

An air pad having a plurality of foam filled air chambers interconnected by at least one air passage connecting at least two of the air chambers to one another. The air passages are also filled with foam whereby the flow of air from one air chamber to another due to impact is restricted. The pad is manufactured by radio frequency welding of two layers of plastic film to one another about a foam body to join the plastic film in the area surrounding each of the air chambers.

24 Claims, 8 Drawing Sheets

AIR PAD

This is a division of U.S. patent application Ser. No. 09/108,634, filed Jul. 1, 1998.

BACKGROUND AND SUMMARY OF THE INVENTION

This application claims priority from a provisional application filed Jul. 1, 1997, under U.S. patent application Ser. No. 60/051,419, entitled "Air Pad." This invention relates to an air pad and in particular to an air pad that automatically spreads an impinging force over a larger area of a surface, reducing the force per unit area sufficiently to protect the surface from damage and/or to provide improved comfort.

Various types and structures of air pads are known. Many are difficult to produce on a large scale and at a low enough cost to be widely accepted in the marketplace. The present invention has been developed to provide an air pad which can be economically produced on a commercial scale and provide improved performance compared to previous air pads.

The air pad of the present invention includes first and second plastic film portions that are joined to one another forming two or more air chambers with integral, interconnecting air passages therebetween. Both the air chambers and the air passages contain foam.

The plastic film portions can be joined together by a heat joining process such as dielectric welding or sealing, also known as radio frequency welding, as well as a variety of other plastic heat joining processes including, but not limited to, ultrasonic welding, vibration welding, induction welding, microwave welding, friction welding, etc. In addition, adhesive bonding of the plastic sheets can be used in some embodiments of the air pad.

In one method of manufacturing the air pad, a layer of sheet foam is placed between the two plastic film portions. The plastic film portions are joined by radio frequency welding. During the joining process, the plastic film portions, in the areas surrounding the air chambers, are fused together to join the film portions. Additionally, where the plastic film portions are joined, the cellular structure of the foam layer between the plastic film portions is collapsed. The collapsed foam material forms a part of the fused joint between the plastic film portions.

In another method of manufacturing the air pad, a foam body is pre-molded or pre-formed in the shape of the air chambers and interconnecting air passages. The plastic film portions may also be pre-molded into the shape of the air chambers and interconnecting air passages. The plastic sheets are then joined together with the pre-molded foam body therebetween, substantially filling the air chambers and air passages.

The air pad is preferably manufactured as a sealed air tight pad. If desired, an inflation valve, or pump, to inflate the air pad, such as that shown in U.S. Pat. No. 4,566,137, hereby incorporated by reference, can be added to the air pad to enable the air pressure within the pad to be varied.

The air pad of the present invention can be used to provide impact protection for various parts of the body. When an impact is received, air will flow from one or more of the chambers, through the interconnecting air passages, to adjacent chambers in response to an increased air pressure within the chambers receiving the impact. The foam, within both the air chambers and the interconnecting air passages, slows the flow of air between chambers. This regulation or restriction of the air flow from one chamber to the next, prevents the air chambers from deflating as quickly as air chambers in a pad with no restriction of the air flow between chambers.

The air pad can be used to provide impact protection within protective equipment such as that worn during athletic events. This includes shin guards, knee pads, elbow pads, shoulder pads, within a flexible fabric or elastic cover, etc. The air pad can also be used to provide impact protection as a pad within a substantially rigid shell such as a helmet, shoulder pad, elbow pad, etc. The air pad can also be used in low or no impact applications where additional cushioning is desired for comfort, as opposed to impact protection. These uses include, but are not limited to, shoulder straps and handles for luggage, briefcases, computer cases, golf bags, back packs, etc. The air pads can also be used in shoes, shoe tongues, etc.

Since the air pad is made by placing a foam sheet between two layers of plastic and then fusing the plastic together between the desired air chambers, it is simple to manufacture the pad. As a result, economical manufacture on a commercial basis is possible. A wide variety of sizes and shapes can be made. Different performance characteristics, i.e., impact spreading and cushioning can be achieved by different foam thicknesses and types of foam.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
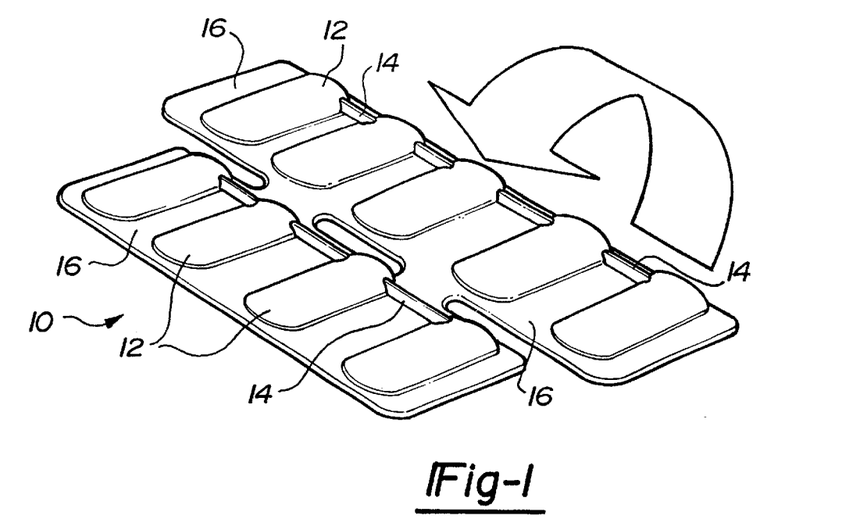
FIG. 1 is a perspective view of an air pad made according to the present invention.

The air pad of the present invention is shown in FIG. 1 and designated generally at 10. Air pad 10 is made of two plastic film portions joined together with a foam layer therebetween. The foam substantially fills a plurality of spaced apart air chambers 12. The chambers 12 are connected to one another by interconnecting air passages 14, which also contain foam. The air chambers are surrounded by fused portions 16 where the two plastic film portions are joined together. The air pad 10 shown in FIG. 1 is representative of one arrangement, or configuration, of the air chambers. The air pad of this invention is not limited to any particular size, shape or arrangement of the chambers 12.

Figure 2:
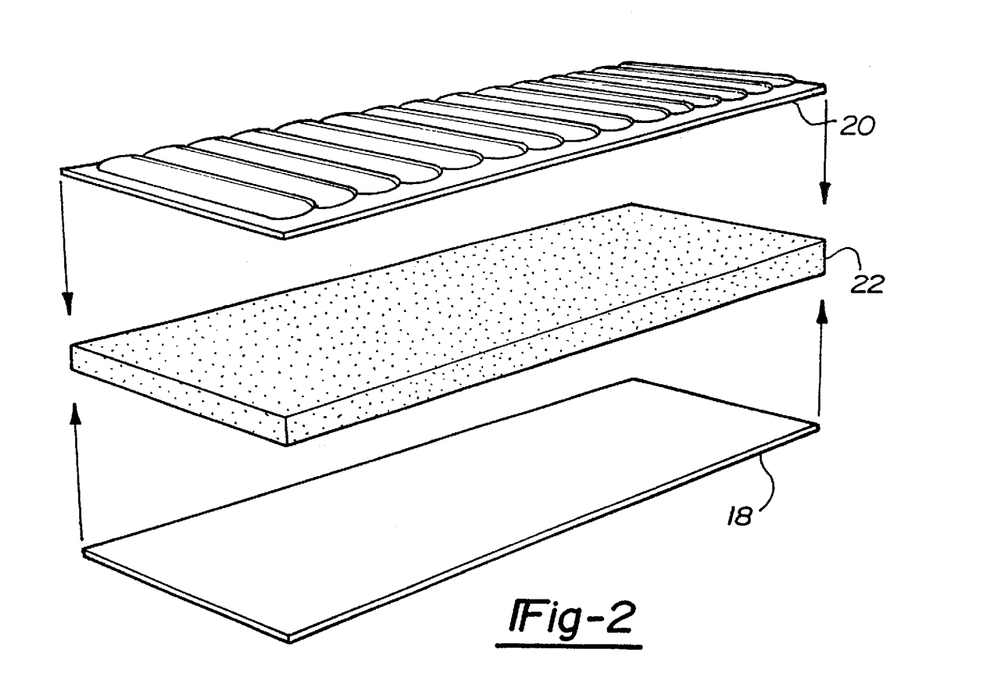
FIG. 2 is an exploded perspective view of the air pad of the present invention showing the components of the pad.

With reference to FIG. 2, the construction of the air pad is shown in greater detail. The air pad is made of two sheets of flexible plastic film, lower sheet 18 and upper sheet 20, with a layer of foam 22 therebetween. It will be apparent that one sheet of plastic, folded over on itself, can be used in place of two separate sheets. The plastic sheets can either be flat, as the sheet 18 or alternatively, the plastic sheets can be preformed to the shape of the air chambers as shown with the upper sheet 20. The plastic sheets and foam are placed between two dielectric sealing tools which engage portions of the sheets 18 and 20. The dielectric tools are used to locally heat and seal the sheets and to collapse the cellular structure of the foam 22 therebetween. The plastic sheets are thus sealed to one another in the area surrounding the air chambers.

Figure 3:
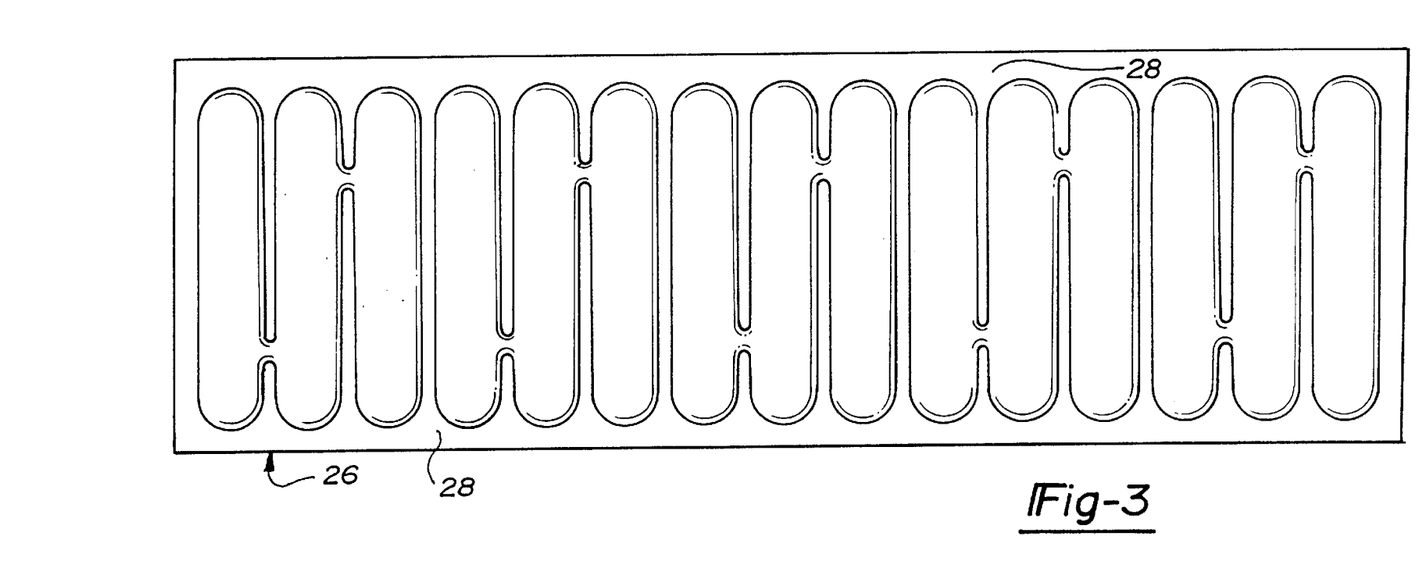
FIG. 3 is a plan view of a dielectric sealing tool for manufacture of the air pad of the present invention.

FIG. 3 shows a representative example of a dielectric tool 26 illustrating the contact surface 28 of the tool where the tool contacts the plastic sheets to seal them. The air chambers 12 and interconnecting air passages 14 of the air pad are formed between the locations where the dielectric tool contacts the plastic sheet in recesses or cavities 12' and 14', respectively, in the dielectric tool.

Figure 4:
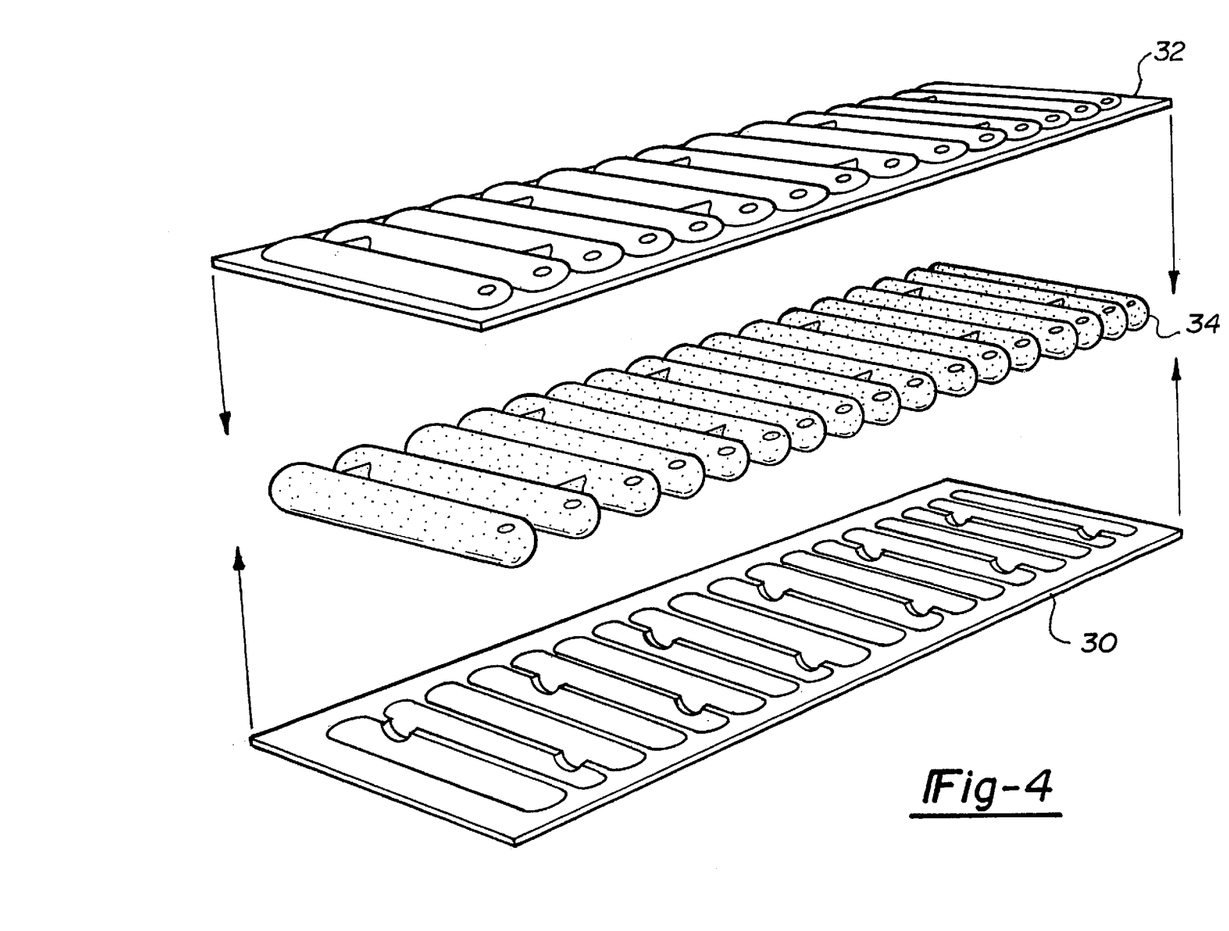
FIG. 4 is an exploded perspective view of an air pad similar to FIG. 2 showing an alternative construction and method of manufacturing the pad.

Another method of manufacturing the air pad is shown in FIG. 4. There, a lower plastic sheet 30 and an upper plastic sheet 32 are both preformed to the shape of the air chambers and interconnecting passages. In addition, the foam 34 is also pre-formed or die cut to the shape of the air chambers and air passages. The plastic sheets can be joined together using radio frequency sealing or other weld joining processes mentioned above. However, there will be no foam between the sheets where the sheets are joined. Since there is no foam where the sheets are joined together, adhesive can be used to Join the plastic sheets together instead of a heat welding type joining process.

The foam can be either an open cell or a closed cell type foam. With an open cell foam, air flows through the foam cells as the air travels from one chamber to another. With a closed cell foam, air on the surface of the foam is allowed to flow between the foam and plastic sheets from one chamber to the next. Upon impact, the air contained within the closed cells is also compressed. A closed cell foam will likely produce a greater restriction to air flow between chambers. The foam can be made of a variety of plastic resins including, but not limited to polyurethane. A dielectric foam having a PVC additive may be preferred when dielectric sealing is used to manufacture the pad. Other resilient foam materials can be used as well.

Likewise, a variety of plastic resins can be used for the plastic film sheets including polyurethane, vinyl and blends containing different percentages of each or other resins. While vinyl and polyurethane are preferred, any plastic film which can be dielectrically or adhesively sealed can be used. The plastic film can include various additives such as UV stabilizers and flame retardants.

Figures 11, 12, 13:
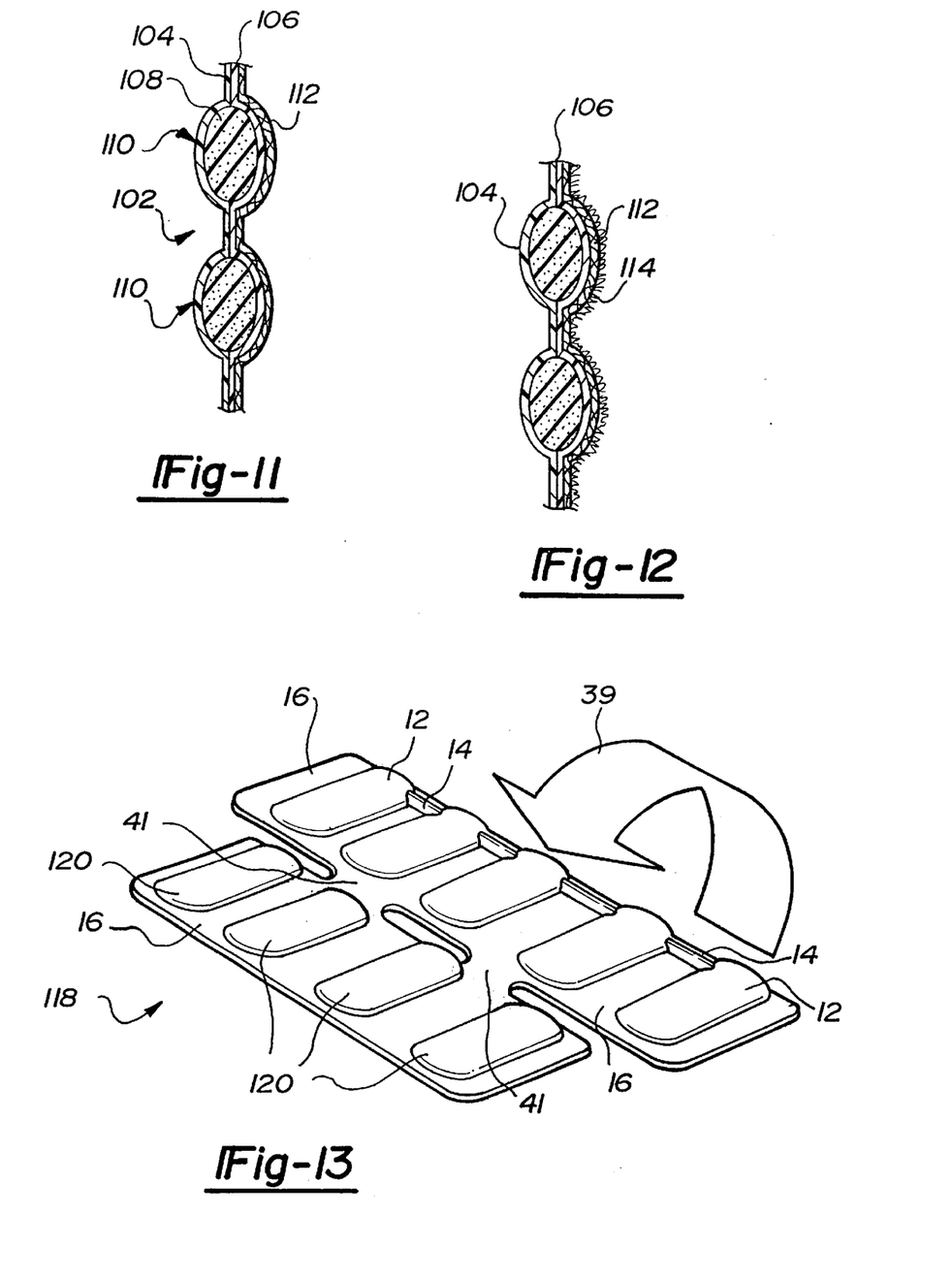
FIGS. 11 and 12 are cross sectional views of alternative embodiments of the air pad of the present invention.
FIG. 13 is a perspective view similar to FIG. 1 of yet another embodiment of the present invention.

The plastic film can also be laminated, bonded to or coated to other materials such as, but not limited to, nylon, polyester, fabrics and hook and loop fastener materials. For example, with reference to FIG. 11, a pad 102 is shown. The pad 102 has plastic film sheets 104 and 106 with foam 108 forming the air chambers 110. The plastic film sheet 106 is laminated to a layer 112 which can be a nylon, polyester etc. layerwhich is woven, knit etc., into a fabric. The layer 112 can provide durability to the air pad when made of a durable woven material and can also provide a different appearance to the air pad. The pad 102 is formed by first laminating the plastic film sheet 106 to the outer layer 112. The laminate construction is then used to form the pad 102 as described above. The selection of the material 112 is guided by those materials which can withstand the heat sealing process such as the dielectric welding used to join the plastic sheets 104 and 106. Another embodiment is shown in FIG. 12. In this embodiment, the layer 112 is the backing to the loop portion of a hook and loop fastener. As a result, a plurality of randomly oriented loops 114 forms the exterior surface of the air pad.

Figure 5:
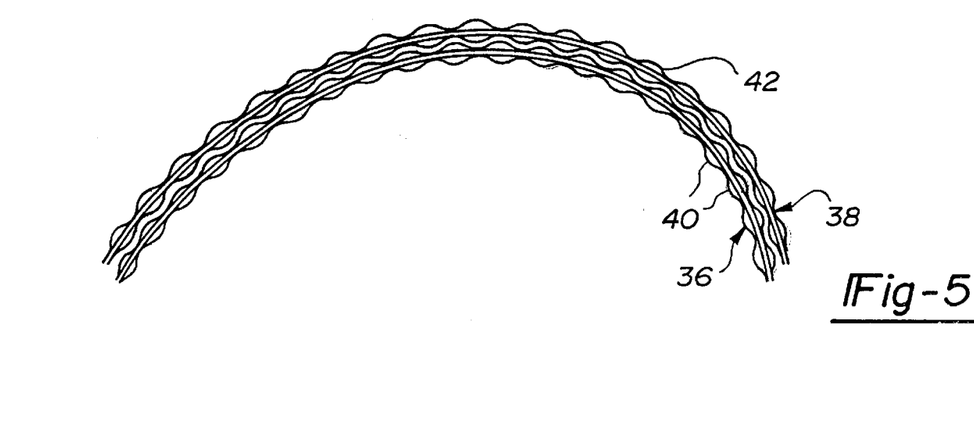
FIG. 5 is a side elevation view of two air pads placed together forming a double layer for enhanced impact protection and/or cushioning.

The film thickness is typically between 5 and 20 thousands. A preferred range is between 10 and 15 thousands. Below 10 thousands, sealing can be difficult. Above 15 thousands, depending on the material type, the plastic may not be sufficiently elastic and overly compresses the foam within the air chamber. Other A single layer of air chambers can be used to provide impact protection and/or cushioning. Alternatively, two or more layers of air chambers can be used to provide enhanced protection and comfort. This is also shown in FIG. 5 where two air pads 36 and 38 are placed together, forming a double layer of air chambers. When using multiple layers, it is preferred to arrange the air chambers 40 of one layer between the air chambers 42 of an adjacent air layer as shown. With multiple layers of air chambers, the force of an impact is spread over a larger number of chambers, providing a greater reduction in the force per unit area applied to the under lying surface. A double layer of air chambers can be formed with a single pad that is folded over on itself to form two layers, as shown in FIG. 1 by the arrow 39. The joined plastic film sections 41 form a hinge between the two rows of air chambers 12.

Figure 6:
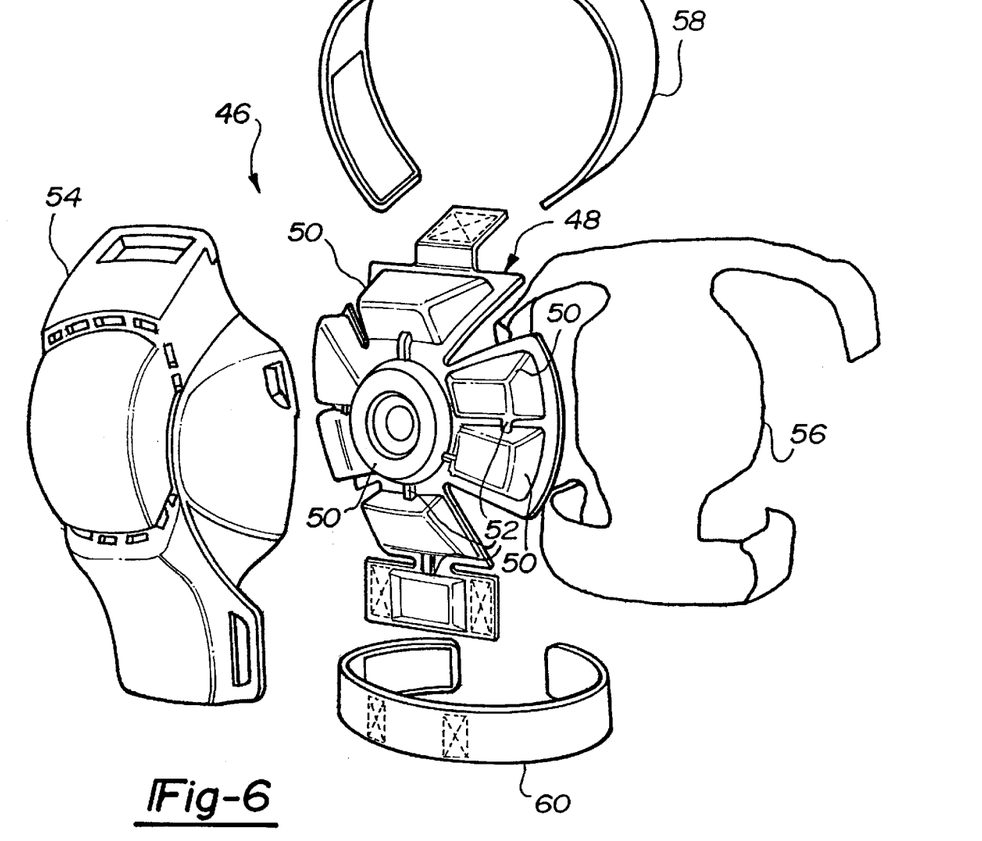
FIG. 6 is an exploded perspective view of a knee pad utilizing the air pad of the present invention.

The air pads of the present invention can be used in a variety of applications. One application is shown in FIG. 6 where it is used as a liner within a knee pad assembly 46. The assembly 46 includes an air pad 48 having a plurality of air chambers 50 and interconnecting air passages 52. The knee pad assembly further includes a semi-rigid or rigid molded plastic shell 54 to which the air pad is mounted by extending tabs 59. Other mounting means can be used to mount the air pad to the outer cover. An inner cover 56 may be added to cover the inner side of the air pad to provide a soft, comfortable surface for contact with the wearer. Straps 58 and 60 are used to attach the assembly to a person's leg. The straps pass through slots on the outer cover, such as slot 61. The molded shell can be made of a variety of plastics, including but not limited to polypropylene. In some applications, the air pad can be used as a liner within a flexible cover of fabric, vinyl, leather, etc. instead of a rigid molded plastic cover.

Figure 7:
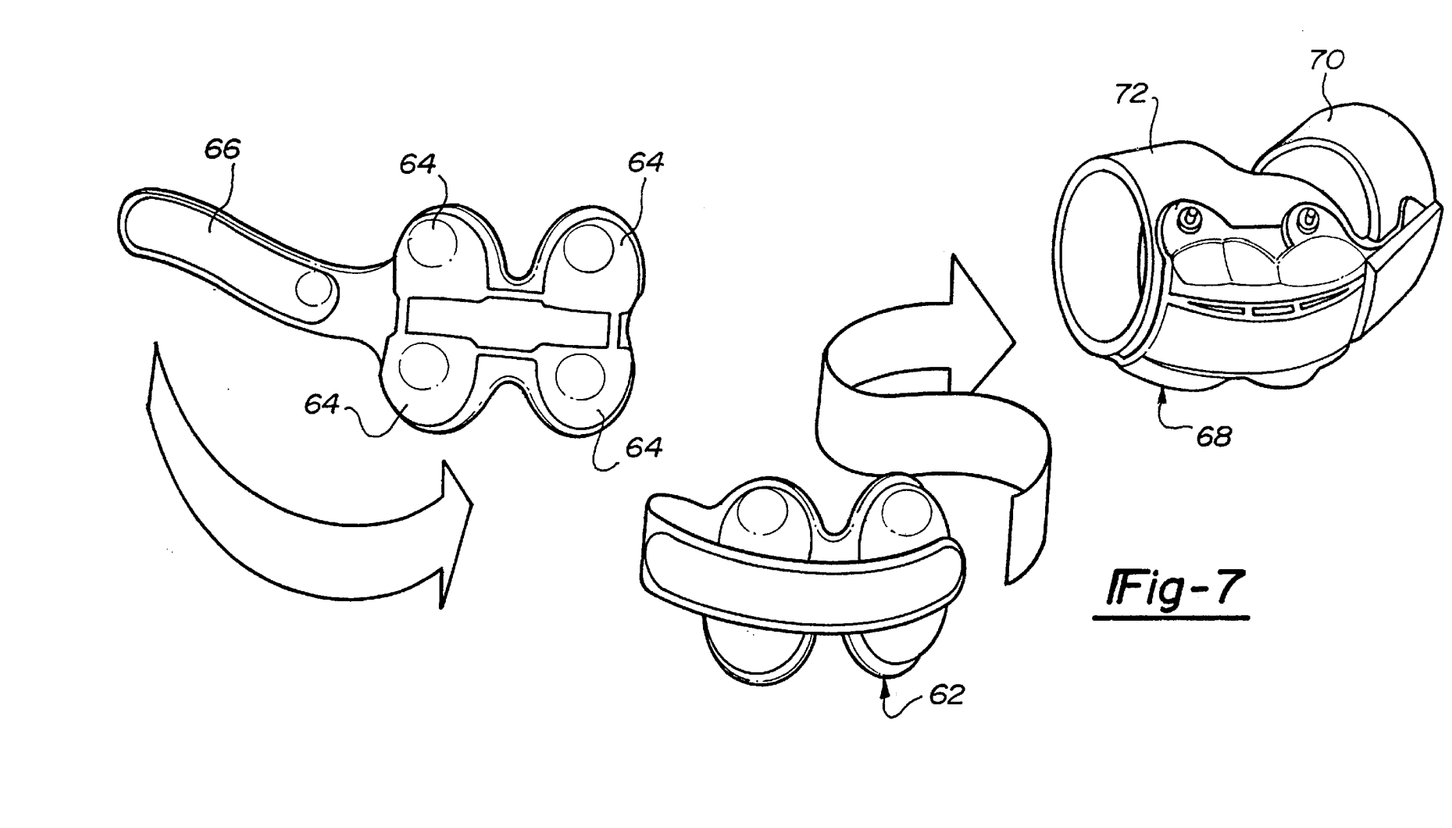
FIG. 7 is an exploded perspective view of an elbow pad utilizing the air pad of the present invention.

An elbow pad assembly is shown in FIG. 7 which includes an air pad 62 having four generally spherical air chambers 64 and a fifth tubular air chamber 66 that is not interconnected with any of the other air chambers. The air pad is folded over with the tubular air chamber 66 being disposed between the spherical chambers 64, forming a double layer of air chambers. The air pad 62 is placed within a shell 68. Straps 70 and 72 are joined to the shell 68 for receiving the arm of a wearer.

Figure 8:
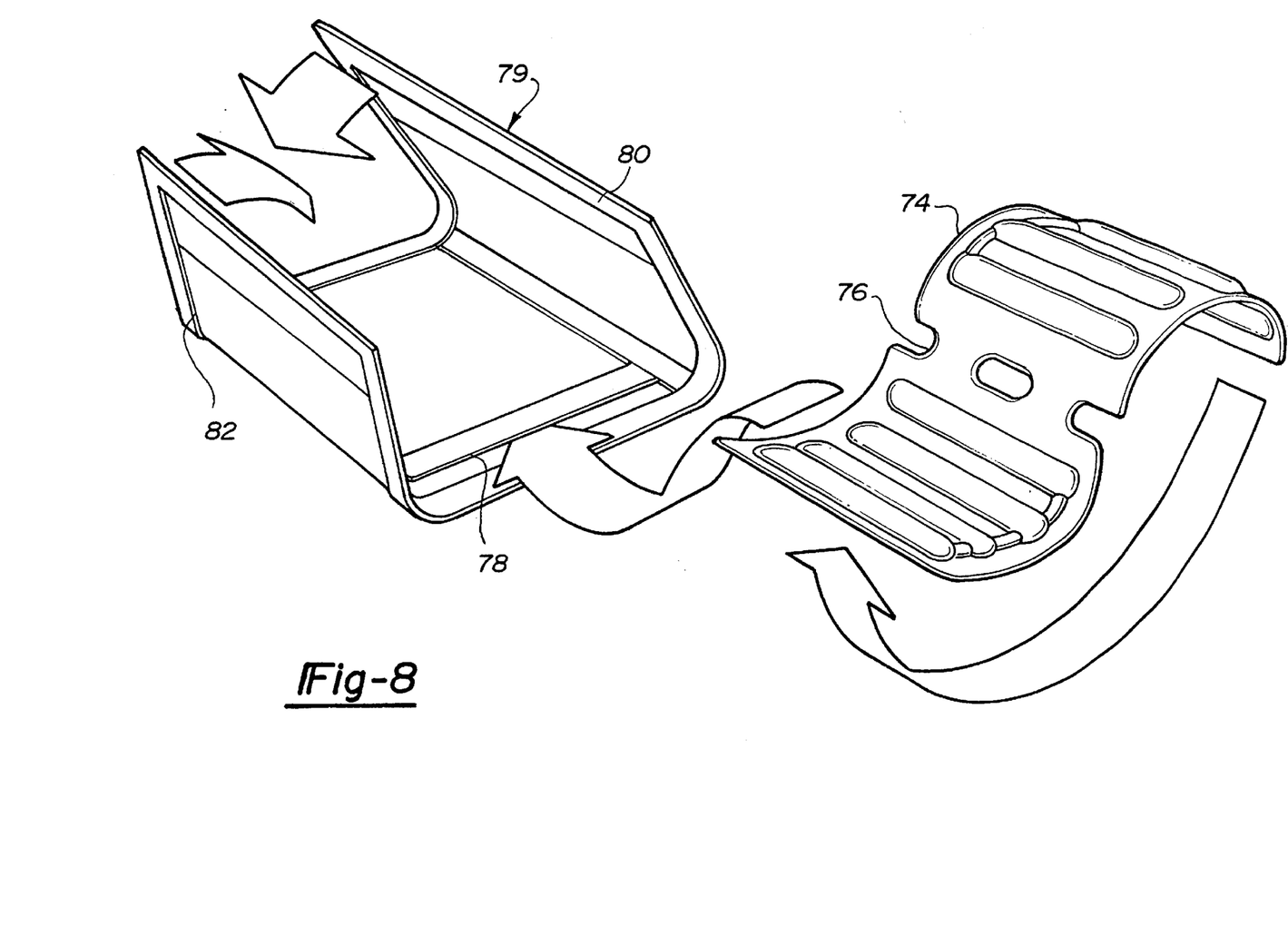
FIG. 8 is an exploded perspective view of an add-on luggage handle pad utilizing the air pad of the present invention.

The air pad of the present invention can be incorporated into a pad for a luggage handle or strap as shown in FIG. 8. An air pad 74 is formed with a hinge 76 allowing the pad to be folded over on itself forming a double layer of air chambers. The folded pad is inserted into a pocket 78 within a fabric cover 79. The cover 79 includes mating hook and loop fastener strips 80 and 82, allowing the cover 79 to be wrapped around a luggage handle or a luggage shoulder strap to provide additional cushioning.

Figures 9, 10:
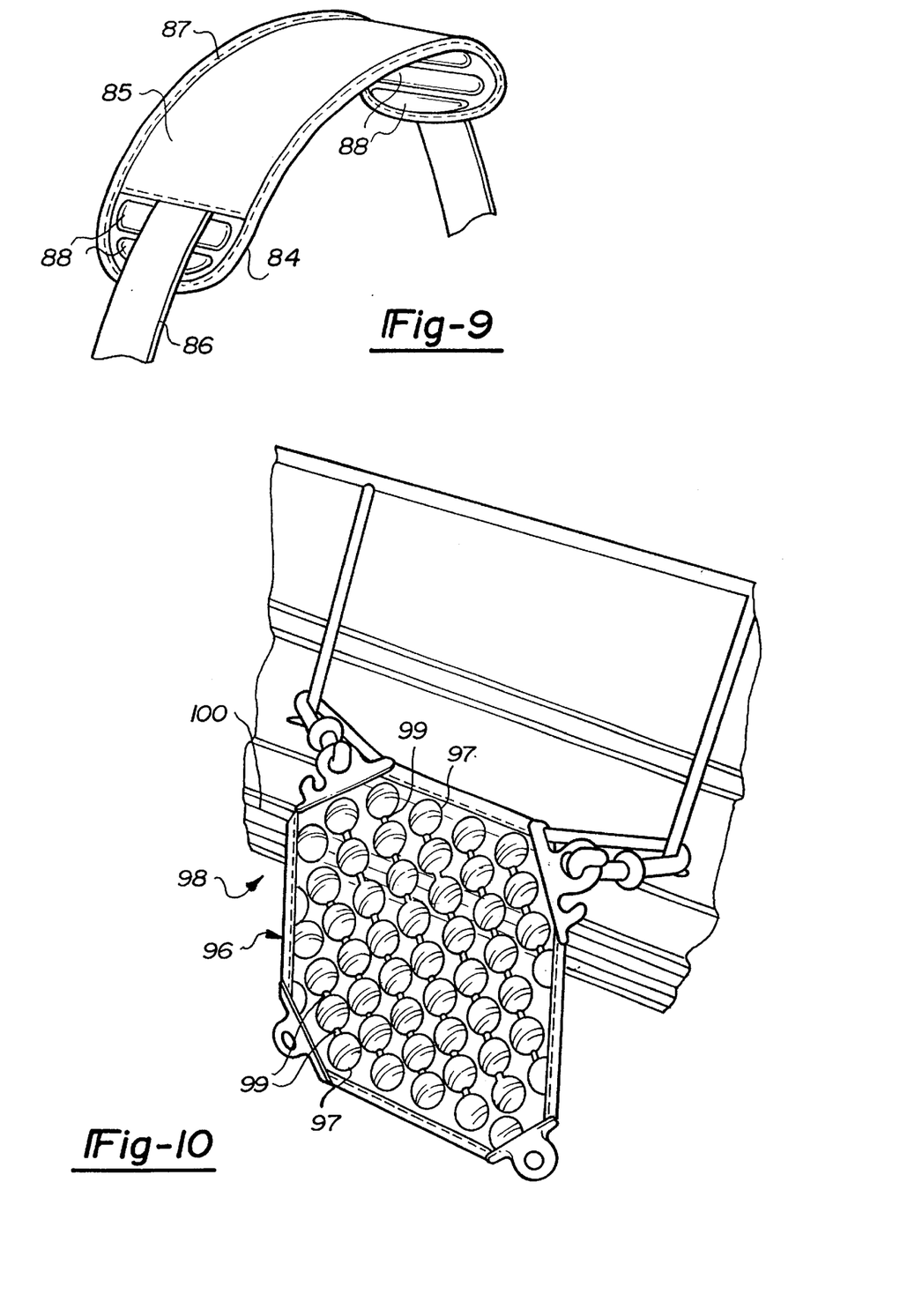
FIG. 9 is a perspective view of a shoulder strap pad utilizing the air pad of the present invention.
FIG. 10 is an partial perspective view of a boat with the air pad of the present invention attached thereto for use as a boat bumper.

An air pad 84 is shown in FIG. 9 for use in conjunction with a shoulder strap 86. The pad 84 includes a number of air chambers 88. A panel 85 is sewn to the pad 84 by stitching 87 to form a slot between the pad 84 and panel 85. The strap 86 extends through the slot to mount the pad to the strap. The pad can be integrally formed into the shoulder strap by sewing the ends of the pad to the shoulder strap webbing. The shoulder strap can be used in luggage, purses, back packs, etc.

Another application of the air pad of the present invention is shown in FIG. 10 where an air pad 96 is mounted to a boat 98. Pad 96 hangs over a side edge 100

Another application of the air pad of the present invention is shown in FIG. 10 where an air pad 96 is mounted to a boat 98. Pad 96 hangs over a side edge 100 of the boat to provide protection to the boat. Pad 96 includes spherical air chambers 97 and interconnecting air passages 99.

An alternative embodiment of the air pad of the present invention is shown in FIG. 13. There the pad 118 shown is similar to the pad 10 in FIG. 1. The pad has one or more air chambers 120 which are filled with foam as described above. The air chambers 120 are not interconnected with any other of the air chambers in the pad. Depending on the comfort or cushioning characteristics required, the air pad may have one or more air chambers that are filled with foam but not interconnected with another air chamber whereby upon impact, the air sealed within the air chamber 120 is only compressed. The air does not travel out of the chamber 120.

The air pad of the present invention can be used by itself in a comfort or protection device. Alternatively, a cushion can be constructed having one or more air pads according to the present invention, combined together with one or more layers of foam or other cushioning material. Depending upon the application, having multiple layers of air pads and foam may be desired.

The air pad of the present invention can be used in any application where cushion or impact protection is desired including, but not limited to, shoe soles, shoe sole liners, sole inserts and the tongue of the shoe, medical devices, athletic equipment, apparel, sports, fishing, hunting, hiking, and camping equipment and can be used in many fields including, but not limited to, athletics, packaging, aerospace, automotive, marine and military.

It is to be understood that the invention is not limited to the exact construction illustrated and described above, but that various changes and modifications may be made without departing from the spirit and scope of the invention.

We claim:

1. An air pad comprising a plurality of separate air chambers each filled with foam, each air chamber having at least one peripheral edge; and an air passage connecting two of the air chambers to one another at their respective peripheral edges, the air passage being filled with foam and having an opening along the peripheral edge of each of the two air chambers that is substantially smaller than the respective peripheral edge whereby air flow from one air chamber to the other through the air passage is partially restricted.

2. The air pad of claim 1 wherein the air chambers have a plastic film outer layer.

3. The air pad of claim 1 having two layers of plastic film joined together around foam to form the air chambers and air passages.

4. The air pad of claim 3 wherein the two layers of plastic film are joined together by heat welding.

5. The air pad of claim 3 wherein the two layers of plastic film are joined together by an adhesive.

6. The air pad of claim 3 wherein the foam is molded foam with the plastic film layers placed over the foam.

7. The air pad of claim 3 wherein the foam is sheet foam placed between the plastic film layers and a foam cell structure of the foam is collapsed by heat at locations surrounding the air chambers wherein the plastic film layers are joined together.

8. The air pad of claim 3 wherein the plastic film layers are made of resin selected from the group of polyurethane, vinyl and blends of polyurethane and vinyl.

9. The air pad of claim 3 further comprising a third layer of material laminated to one of the two layers of plastic film.

10. The air pad of claim 1 wherein the foam is open cell foam.

11. The air pad of claim 1 wherein the foam is closed cell foam.

12. The air pad of claim 1 wherein the foam within the air chambers is partially compressed.

13. The air pad of claim 1 wherein the foam within the air passage is partially compressed.

14. The air pad of claim 1 further comprising at least one air chamber filled with foam and sealed to contain air therein.

15. A protective device comprising:

air pad having a plurality of separate air chambers each filled with foam and each having at least one peripheral edge; and at least one air passage connecting two of the air chambers to one another through the respective peripheral edges, each air passage being filled with foam and having an opening along the peripheral edge of each of the two air chambers with each of the openings extending along only a portion of the respective peripheral edges whereby air flow from one air chamber to another through the air passages is partially restricted;

an outer cover to which the air pad is mounted;

means for attaching the outer cover and the air pad mounted thereto to a supporting structure.

16. The protective device of claim 15 further comprising an inner liner for engagement with the supporting structure.

17. The protective device of claim 15 wherein the air pad is removably mounted to the outer cover.

18. The protective device of claim 15 wherein the outer cover is a rigid body.

19. The protective device of claim 15 wherein the outer cover is a flexible sheet.

20. The protective device of claim 15 wherein the outer cover has a pocket therein for receiving the air pad to mount the air pad thereto.

21. The protective device of claim 20 wherein the outer cover has extending portions which wrap around the supporting structures and fasten to one another to attach the outer cover to the supporting structure.

22. The protective device of claim 15 wherein the means for attaching the outer cover includes straps extending from the cover for wrapping around the supporting structure.

23. The protective device of claim 15 wherein the means for attaching the outer cover to a supporting structure includes a hook and loop fastener.

24. A pad comprising:

a plurality of separate chambers, each of said chambers being filled with foam and having at least one peripheral edge;

a passageway extending between said peripheral edge of one of said chambers and the peripheral edge of another of said chambers, said passageway connecting said one of said chambers to said another of said chambers at openings located on opposite ends of said passageway;

said passageway being filled with foam such that airflow from said one of said chambers to said another of said chambers is channeled only through said passageway;

and wherein each said opening of said passageway extends only partially along the length of the respective peripheral edges of said chambers.

* * * * *